Nov. 23, 1965  R. J. FOREMAN ETAL  3,219,901
WINDSHIELD WIPER CONTROL
Filed June 27, 1963
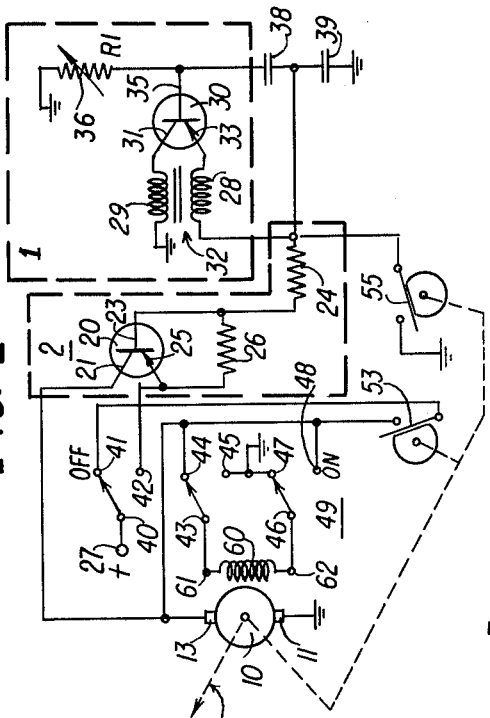
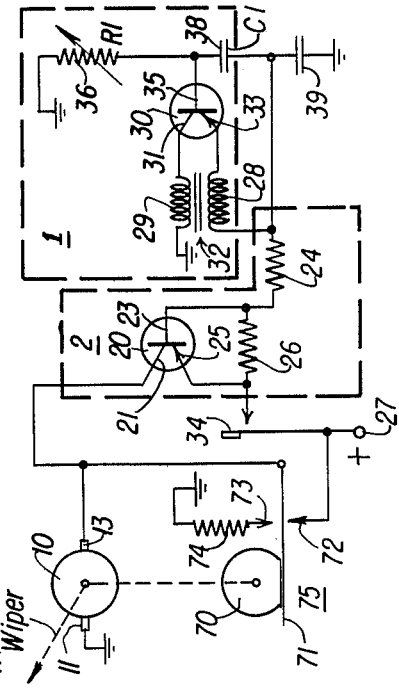
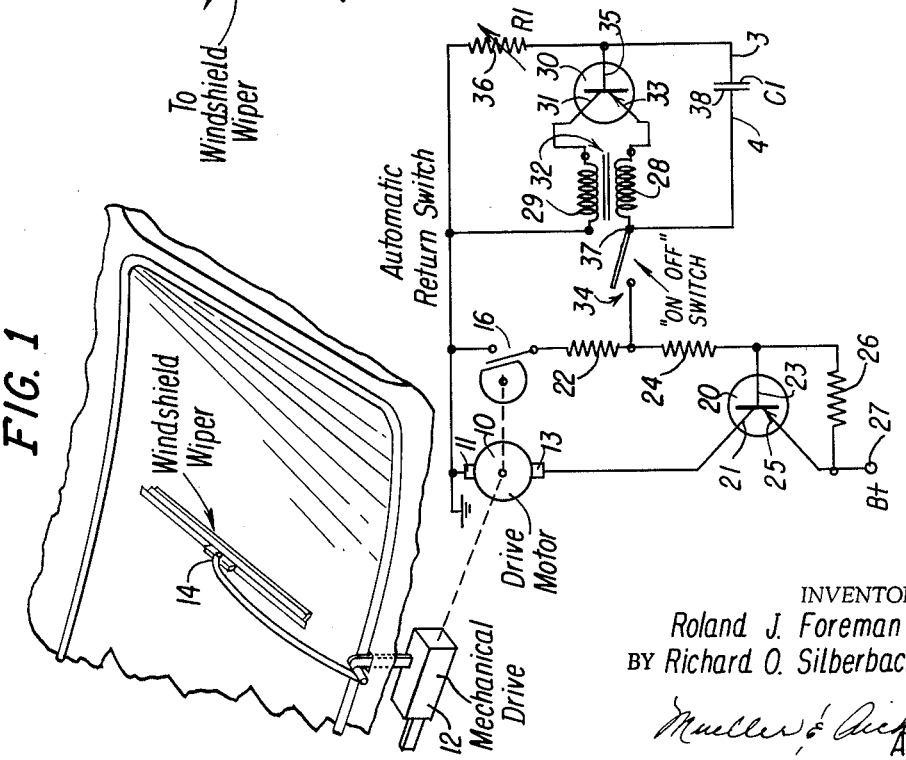
INVENTORS
Roland J. Foreman
BY Richard O. Silberbach United States Patent Office 3,219,901
Patented Nov. 23, 1965

3,219,901
WINDSHIELD WIPER CONTROL
Roland J. Foreman, Franklin Park, Ill., and Richard O. Silberbach, Worthington, Ohio, assignors to Motorola, Inc., Chicago, Ill., a corporation of Illinois
Filed June 27, 1963, Ser. No. 291,094
13 Claims. (Cl. 318—443)

This invention relates to an improved control system for intermittent operation of an electrical device and it is more particularly directed to such an improved control system which is constructed to impart a controllable intermittent drive to a windshield wiper. This application is a continuation-in-part of application Serial No. 51,920, filed August 25, 1960, now abandoned.

To observe an intermittently operated instrumentality continuously repeat its operation is annoying and tiring to the observer. For this reason, winshield wipers, although performing an important and necessary function, have often been a source of annoyance and irritation to the car driver. It is usual for windshield wipers in most motor vehicles to be reciprocally driven in a continuous arcuate manner. It is also usual for the prior art windshield wipers to be driven at a constant speed, because of the relatively high cost of variable speed drive motors. In cases where variable speed drive motors have been used, at any selected position, the wipers are operated continuously at the same speed in both directions.

It is therefore an object of the present invention to provide an improved electronic control for use in conjunction with an electrical device which enables the device to be energized is an intermittent manner with the intermittent rate of operation being controllable.

Another object is to provide an electronic control for use in conjunction with a windshield wiper, or equivalent instrumentality, which enable the windshield wiper to be driven in an intermittent manner at a constant stroke velocity and with the intermittent stroking rate being manually controllable.

Another object of the invention is to provide such an improved electronic control which can readily be adapted to and incorporated in existing constant speed electric motor types of windshield wiper drive assemblies.

Yet another object of the invention is to provide such an improved electronic control which can be adapted to control windshield wiper drive assemblies using electric motor types having permanent magnet fields.

A further object of the invention is to provide an improved electronic control which can be readily adapted to be used in windshield wiper drive assemblies having a depressed park feature.

Yet another object of the invention is to provide such an improved electronic control which serves to minimize the electric current drain of the windshield drive assembly on the battery or equivalent power source in the motor vehicle on which the assembly is installed.

A feature of this invention is the provision of a switching system including a self-pulsing oscillator which controls the rate of operation of the switching system.

Another feature of the invention is the provision of a self-pulsing oscillator and switch in circuit with the drive motor of a windshield wiper, or similar instrumentality, and which intermittently makes and breaks the energizing circuit to the drive motor at a controllable rate to provide the desired intermittent control of the windshield wiper.

It is to be understood that although the improved control of the present invention has important utility in the drive mechanisms of windshield wiper blades and the like, and for that reason will be described in such an environment, the invention finds utility wherever it is desired to energize an instrumentality at a controllable intermittent rate.

The invention is illustrated in the drawings wherein:
FIG. 1 illustrates one form of the circuit used to control the operation of a windshield wiper for a motor vehicle;
FIG. 2 illustrates another embodiment of this circuit which can be used to control the operation of a vehicle windshield wiper having a depressed park feature; and
FIG. 3 illustrates another embodiment of this device which can be used to operate windshield wipers driven by a permanent magnet field motor.

In practicing the invention a transistor switch is provided with pulses from a self-pulsing blocking oscillator. These pulses turn the transistor switch on thus connecting the windshield wiper drive motor to the power supply causing the motor to rotate. Upon its initial rotation the motor closes a switch which delivers power to the motor for one complete cycle independent of the operation of the self-pulsing blocking oscillator. At the end of one cycle of operation this switch opens and the wiper will not operate again until actuated by a pulse from the self-pulsing blocking oscillator.

The self-pulsing blocking oscillator includes a capacitor cross which a bias potential is developed which increases with each cycle of oscillation so that after a large number of cycles the bias potential thus generated becomes sufficient to cut off a tube or transistor. The tube or transistor remains cut off until the potential on the capacitor decays to a value such that oscillation can again take place. The oscillation frequency is known as the fundamental frequency and is determined by the LC constants of the network. The frequency of the on-off period of the active device is known as the pulse recurrence frequency and it is determined by the RC time constants of the bias network.

Illustrated in FIG. 1 is an electric drive motor 10 which is mechanically coupled to a mechanical drive 12 for a windshield wiper 14. The drive motor 10 is also mechanically coupled to an automatic return switch 16 for the windshield wiper. The components described above are usually incorporated in a single package, and are presently available on the market. Such a package is used today on many automobiles utilizing electric windshield wipers. It includes an automatic return or "parking" switch which may conveniently be a microswitch or a similar lever operated switch, mechanically associated with the shaft of a rotating member of the windshield wiper drive motor. The switch is generally arranged to cooperate with a cam or other mechanical member coupled with a shaft driven by the motor so that it is in a closed position for the purpose of maintaining energization of the drive motor during a substantial portion of the cycle of operation of the wiper. The switch returns to an opened position at a determined point in the path of traverse of the windshield wiper blade. This position usually coincides with a rest position which is out of view of the driver of the vehicle, and is determined by a preset angular position of a rotating member of the wiper drive motor. By this arrangement the wiper blade is allowed to complete a cycle and return to its rest position independent of auxiliary wiper control arrangements. Such a feature and mechanical embodiments for accomplishing it are conventional in the art and deemed desirable in systems employing electrical windshield wiper drives so that the blade will not stop in the line of vision of the driver whenever the system is deenergized.

When the motor 10 is energized it rotates and causes the mechanical drive 12 reciprocally to move the windshield wiper 14 back and forth along an arcuate path. The reciprocal motion of the windshield wiper 14 is from a predetermined angular position. When the instrumentality is turned off the switch 16 is held closed to return the windshield wiper 14 to its original predetermined angular position, usually out of the line of vision of the driver of the motor vehicle. Therefore, the switch 16 normally serves to control an independent energizing path to the motor 10 so as to energize the motor whenever the windshield wiper is angularly displaced from its predetermined rest position. When the wiper has been returned to its rest position, the mechanical coupling between the motor 10 and the switch 16 causes the switch 16 to open.

As mentioned above, it is usual for the electric motor 10 to be a constant speed motor, so that when it is energized it drives the windshield wiper 14 back and forth at a constant speed and in a continuous manner. The purpose of the present invention is to obviate the fatigue and eye strain caused by such a motion of the windshield wiper, and to provide a control which produces an interval between each succeeding stroke of the windshield wiper. This interval between each succeeding stroke, as will be described, is manually controllable in the illustrated embodiment of the invention so that the stroke rate of the windshield wiper may be variable although the speed of the wiper for each stroke is constant.

One of the brushes 11 of the drive motor 10 is connected to a point of reference potential, such as ground, and the other brush 13 is connected to the collector 21 of transistor 20. The emitter 25 of transistor 20 is connected to the positive terminal 27 of an appropriate source of direct current energizing potential. The negative terminal of this source may be connected to the point of reference potential. This source supplies activating energy to the electronic control of the invention, and it also supplies electric energy to the drive motor 10. The switch 16 is a single pole single throw type, and its fixed contact is connected to the reference potential. The movable contact of the switch 16 is connected to a resistor 22 which in turn is connected to a resistor 24. The resistor 24 is connected to the base 23 of transistor 20. A resistor 26 is bridged across the base 23 and emitter 25 of transistor 20.

A second transistor 30 is connected as a self-pulsing blocking oscillator. For that purpose the collector 31 of transistor 30 is connected through the primary winding 29 of a feedback transformer 32 to the point of reference potential. The emitter 33 of the transistor 30 is connected to the secondary 28 of transformer 32, and the other side of the secondary 28 is connected to an on-off switch 34. The other terminal of the on-off switch 34 is connected to the common junction of the resistors 22 and 24. A variable resistor 36 is connected to the base 35 of the transistor 30 and to the point of reference potential. A capacitor 38 is connected from the base 35 of transistor 30 to point 37. The capacitor 38 thus bridges the emitter to base junction of the transistor and the secondary winding 28 of transformer 32.

In operation a positive voltage is supplied to the self-pulsing oscillator from the power supply terminal 27 through resistor 26, resistor 24 and switch 34. When switch 34 is initially turned on, the voltage on the base 35 of transistor 30 is at the reference potential while the voltage applied to the emitter 33 of transistor 30 is positive, thus transistor 30 is biased so that it is conducting. With transistor 30 biased in the forward direction current flows through the emitter electrode 33 to the collector electrode 31 and from there through the primary winding 29 of transformer 32 to the reference potential. Transformer 32 is poled so that the increase in current in the primary winding 29 induces a voltage in the secondary winding 28 which biases the emitter such that the conduction of transistor 30 is increased. When transistor 30 is saturated the current flow through the primary winding 29 becomes constant and the induced voltage in the secondary winding 28 falls. This decreasing voltage biases transistor 30 so that less current flows in the collector circuit. The falling current in the collector circuit and the primary winding 29 induces a negative voltage in the secondary winding 28 which biases transistor 30 so that it is cut off. With the current through the primary again constant the field of transformer 32 again collapses and a positive voltage is induced across secondary winding 28, turning transistor 30 on again. This cycle repeats itself at the fundamental frequency determined by the inductance of transformer 32 and the capacitance of capacitor 38.

With transistor 30 turned on the voltage appearing across the transformer secondary winding 28 appears across capacitor 38 producing a current which will charge capacitor 38. Since the base to emitter resistance is low with transistor 30 turned on, capacitor 38 will charge rapidly so that point 3 will become positive with respect to point 4. When transistor 30 is cut off no current flows through the base to emitter junction and capacitor 38 will discharge through resistor 36. This discharge path has a high impedance relative to the charging path through the transistor and therefore the rate of discharge of capacitor 38 will be less than the charging rate. When oscillation at the fundamental frequency starts it is maintained by the voltages induced in the transformer windings which are higher than the supply voltage. During each period of conduction of transistor 30 the voltage across capacitor 38 increases and during each off period of the voltage across capacitor 38 decreases at a rate lower than the rate of increase. Thus a positive charge gradually accumulates on capacitor 38 and builds up to a point where it will bias the base to emitter junction of transistor 30 so that the positive potential induced across transformer winding 28 will no longer be high enough to turn on transistor 30. Transistor 30 remains cut off until the charge on capacitor 38 has decayed to a point where the supply voltage is sufficient to bias transistor 30 in the forward direction. When transistor 30 conducts, the oscillation commences again and the charging capacitor 38 builds up to point where transistor 30 conducts. This cycle of conduction and non-conduction of transistor 30 repeats itself as long as a voltage is applied to the oscillator. The on time of transistor 30 is considered to be the time when the circuit is oscillating and the off time is considered to be the time during which the circuit is not operating.

When the self-pulsing oscillator is oscillating at its fundamental frequency current flows through resistor 26 and 24 biasing transistor 20 so that it is conducting. When the transistor 20 is conducting the energizing circuit from the positive terminal 27 of the energizing source is connected to the drive motor 10 so that the drive motor rotates and reciprocally drives the windshield wiper 14 along a arcuate path. As described above each rotation of the drive motor 10 causes the windshield wiper to move in a complete arcuate cycle from its predetermined angularly rest position to a position displaced angularly therefrom and then back to its predetermined angular rest position. When the on-off switch 34 is closed, the energy produced by the oscillatory circuit of the transistor 30 causes a switching amplifier transistor 20 to be conductive so as to complete the energizing circuit to the electric motor 10. When the switch 34 is opened to terminate the operation of the windshield wiper 14 the switch 16 remains closed to complete independent energizing circuit to the motor 10 long enough to return the windshield wiper to its original angular rest position as mentioned above. Switch 16 when closed also maintains the emitter of transistor 30 at the reference or ground potential through resistance 22. This prevents generation of further energy pulses by the oscillator during a complete cycle of the wiper action. Therefore, if oscillator 30 has completed its delay interval before the windshield wiper has gone through a complete cycle and returns to its rest position, the oscillator must wait before producing another energy pulse. At this point switch 16 is opened by the drive motor and the oscillator generates further energy pulses. Such an arrangement maintains complete synchronization between the wiper mechanism and the pulse oscillator.

The oscillator 30 is constructed to generate bursts of energy, and to introduce these bursts to the base of the transistor 20. Therefore, whenever such a burst occurs the windshield wiper 14 is moved away from its position of rest. The switch 16 then closes, and causes the motor 10 to be energized throughout the remainder of the cycle of the windshield wiper. However, when the windshield wiper 14 again is returned to its original rest position at the completion of the cycle by the energizing circuit established by switch 16, the bursts from the oscillator will have terminated, so that the windshield wiper remains at its rest position until the next burst of energy from the oscillator is initiated. Then the windshield wiper undergoes a further cycle. In this manner, the actuation of the windshield wiper 14 is intermittent rather than continuous. The interval between each successive cycle of the windshield wiper may be controlled by adjustment of the variable resistor 36.

It is noted that during the running cycle of the windshield wiper 14, the base of the transistor 20 is grounded through resistors 24, 22 and through switch 16. However, when the windshield wiper 14 is at its angular rest position, the only ground return for the base of transistor 20 is provided through the oscillator switch. During the delay time between successive actuations of the windshield wiper 14, the oscillator switch is effectively opened. Therefore, the current drain on the power source of the motor vehicle during the delay time is substantially zero and the power utilized is minimized.

FIG. 2 illustrates another embodiment of this device which is incorporated in a windshield wiper having a depressed park feature. When a windshield wiper having this feature is turned off the drive motor reverses its direction of rotation and, through an appropriate mechanical assembly, positions the wiper blade so that it is along the bottom edge of the windshield and out of the line of sight of the driver.

In operation self-pulsing oscillator 1 and switch 2 operate as previously described. Switch 55 is similar in operation to rotary switch 16 of FIG. 1, and causes the wiper blade to continue operation until the mechanical coupling between the drive motor 10 and switch 55 causes the switch to open. Operation of the wiper mechanism is initiated by throwing on-off switch 49 to the on position. Power to the electronic switch 2 and self-pulsing oscillator 1 is furnished from supply terminal 27 through center arm 40 to contact 42 of switch 49. With electronic switch 2 turned on either by the action of self-pulsing oscillator 1 or switch 55, as previously described, power is supplied to the armature of drive motor 10 through transistor 20. Power is supplied to the field winding 60 of drive motor 10 from the collector 21 of transistor 20 through contact 48, center arm 46 to field terminal 62 and from field terminal 61 through center arm 43 and contact 45 to ground. When switch 49 is in the off position power is supplied to the armature of the windshield wiper motor from power supply terminal 27 through center arm 40, contact 41, of switch 49, through switch 53, to terminal 13 of the motor. Power is supplied to the field winding through contact 44, center arm 43 of switch 49 to the field terminal 61 and from field terminal 62 through center arm 46 and contact 47 to ground. It should be noted that the flow of current through field winding 60 is reversed by the action of on-off switch 49 so that drive motor 10 will run in the opposite direction when the switch is turned to the off position. Switch 53 is coupled to drive motor 10 so that when the wiper blade is in its depressed park position switch 53 will open. The wiper blade will remain in the depressed park position until the drive motor 10 is energized by means of oscillator 1 and electronic switch 2 when switch 49 is turned to the on position.

FIG. 3 shows a further embodiment of this invention which is adapted to be used with a windshield wiper drive motor having a permanent magnet field. Since the field of a motor of this type is not cut off when voltage is removed, the motor has a tendency to coast making it difficult to stop the motor before the switch coupled to the drive motor again closes. The operation of self-pulsing oscillator 1 and switch 2 is as previously described. Switch 34 is the on-off switch and when it is closed the operation of the windshield wiper commences. When drive motor 10 starts its rotation, cam 70 coupled to drive motor 10 positions contact arm 71 of switch 75 so that it touches contact 72. This supplied power to the motor through one cycle of operation of the wiper. At the end of one cycle, cam 70 allows switch 75 to open. The design of the center arm 71 is such that upon opening it touches contact 73 momentarily before returning to a rest position where it does not touch either contact. When the center arm 71 touches contact 73 resistance 74 is connected across the armature of drive motor 10 and the drive motor then acts as a generator. The kinetic energy of the armature is converted to electric energy which is dissipated in resistor 74. This acts as a brake on the drive motor causing it to stop before it has rotated a sufficient number of turns to again connect center arm 71 of switch 75 with contact 72.

The invention provides therefore an improved control system by which the windshield wiper of a motor vehicle or similar electrical device can be driven at an intermittent rate, with the interval between strokes being variable from zero, which provides continuous cyclic operation, to a substantial delay between strokes. Moreover, the improved control system of the invention is susceptible of the convenient manual control whereby the intervals between successive activations of the device can be adjusted. In this manner the control of a windshield wiper can be adjusted by the operator so that a minimum of irritation, fatigue, or eye strain is provided under all varying weather conditions.

We claim:

1. A control system for reciprocally driving a driven instrumentality over an arcuate path, said control system including in combination; an electric drive motor adapted to be coupled to the instrumentality for driving the instrumentality through one complete cycle of its arcuate reciprocal movement, an energizing circuit, switching means coupling said energizing circuit to said drive motor and having a first condition in which said energizing circuit supplies electrical energy to said drive motor to energize said drive motor and having a second condition in which said energizing circuit is disconnected from said drive motor, control means coupled to said switching means for periodically actuating said switching means from its second condition to its first condition at spaced intervals intermittently to energize said drive motor, and circuit closing means coupled to said switching means and actuated by said drive motor to maintain said switching means in said first condition during a complete traverse of said arcuate path by said instrumentality.

2. The combination defined in claim 1 in which said switching means is formed by an amplifier circuit including a transistor, and in which said transistor is actuated between a conductive condition and a non-conductive condition by said control means.

3. The combination defined in claim 1 in which said control means is formed by an oscillator including a transistor having an emitter electrode and constructed to generate bursts of energy at spaced time intervals for actuating said switching means to its first condition, said oscillator including manually controllable timing means for determining the repetition rate of said bursts of energy and said circuit closing means being coupled to said oscillator transistor to provide a bias potential to said emitter to inhibit oscillations when said circuit closing means is actuated by said drive motor.

4. The combination defined in claim 1 in which said control means is formed by an oscillator including a transistor and constructed to generate bursts of energy at spaced time intervals for actuating said switching means to its first condition, said oscillator including manually controllable timing means for determining the repetition rate of said bursts of energy, said circuit closing means having contacts, said contacts being closed when said circuit closing means is actuated by said drive motor and being returned to an open position as the device is returned to a predetermined position to thereby allow said oscillator to generate bursts of energy operable to actuate said switching means at the end of the interval determined by said controllable means.

5. A control system for reciprocally driving a windshield wiper along an arcuate path, including in combination, a constant speed electrically energized drive motor to be adapted to be coupled to the windshield wiper for driving the windshield wiper through one complete cycle of its arcuate reciprocal movement for ech rotation of the drive motor, an energizing circuit, a switching circuit including a first transistor and coupling said energizing circuit to said drive motor to energize said drive motor when said first transistor is in its conductive state, an oscilator circuit including a second transistor and coupled to said switching circuit, said oscillator being constructed to generate bursts of electrical energy at spaced intervals for establishing said first transistor in its conductive state during such intervals, and a manually controllable resistance-capacitance network included in said oscillator circuit for controlling the repetition rate of said bursts of energy.

6. The combination defined in claim 5 and which includes a control switching means mechanically coupled to said drive motor and to said energizing circuit for energizing said drive motor independently of said oscillator circuit when the windshield wiper is displaced from a predetermined angular position, so as to return the windshield wiper to said predetermined angular position when said first switching means is in its second condition.

7. The combination defined in claim 1 in which said circuit closing means includes circuit making contacts mechanically coupled with said drive motor to maintain said switching means in said first condition to couple said energizing circuit to said motor independently of said control means as said driven instrumentality is displaced from a predetermined angular position so that said instrumentality is driven through a complete cycle upon initial actuation of said switching means by said control means.

8. The combination defined in claim 1 in which said circuit closing means includes circuit making contacts mehanically coupled with said drive motor and electrically connected between said energizing circuit and said control means so as to prevent said control means from actuating said switching means as said driven instrumentality is dispaced from a predetermined angular position.

9. The combination defined in claim 1 in which said drive motor includes armature means coupled to said switching means and field means, second circuit closing means coupled to said armature means and second and third switching means, said second switching means having a first position coupling said energizing circuit to said switching means and a second position coupling said energizing circuit to said second circuit closing means, said third switching means being mechanically coupled to said second switching means and being electrically coupled to said switching means, and said field means, whererby when said second switching means is in its first position said third switching means couples the output of said first switching means to said field means to cause said drive motor to rotate in a forward direction and when said second switching means is in its second position said third switching means couples said second circuit closing means to said field means to cause said drive motor to rotate in a reverse direction whereby said drive motor returns the device to a rest position and actuates said second circuit closing means to interrupt the electric energy supplied to said drive motor when the driven instrumentality reaches said rest position.

10. The combination defined in claim 1 in which said drive motor includes permanent magnet field means and an armature, said circuit closing means being comprised of a single pole three position switch, said three position switch being in a first position when said switching means is actuated to its first condition by said control means to energize said drive motor, said three position switch being actuated by said drive motor to a second position whereby said switching means is maintained in said first condition, and said three position switch momentarily being in a third position upon completion of a cycle of operation of the driven instrumentality, said three position switch returning to said first position after momentarily being in said third position, and resistance means connected in parallel with said armature means when said three position switch is in said third position whereby the mechanical energy stored in said drive motor is converted to electrical energy.

11. A control system for intermittently driving an instrumentality over an arcuate path, said control system including in combination, a constant speed electric drive motor adapted to be mechanically coupled to said instrumentality, an energizing circuit, switching means coupling said energizing circuit to said drive motor and having a first condition in which said energizing circuit supplies energy to said drive motor and having a second condition in which said energizing circuit is disconnected from said drive motor, control means electrically coupled to said switching means operable to actuate said switching means from its second condition to its first condition at spaced intervals intermittently to energize said motor when said instrumentality is in a predetermined angular position, said control means including a manually controllable timing means for determining the repetition rate of said intermittent intervals of operation, and circuit closing means actuated by said drive motor and operable to energize said motor when said instrumentality is displaced from said predetermined angular position so as to allow said instrumentality to complete a traverse of its arcuate path upon actuation of said switching means.

12. A control system for reciprocally driving a windshield wiper along an arcuate path, including in combination, a constant speed electrically energized drive motor adapted to be coupled to the windshield wiper for driving the windshield wiper through one complete cycle of its arcuate reciprocal movement, an energizing circuit, a switching circuit including a first transistor and coupling said energizing circuit to said drive motor to energize said drive motor when said first transistor is in its conductive state, oscillator circuit including a second transistor and coupled to said switching circuit, said oscillator being constructed to generate bursts of electrical energy at spaced intervals for periodically establishing said first transistor in its conductive state, manually controllable resistance-capacitance network included in said oscillator circuit for controlling the repetition rate of said bursts of energy, and circuit closing means mechanically coupled with said motor to maintain said first transistor in its conductive state and to inhibit generation of said energy bursts by said second transistor during the arcuate reciprocal cycle of said windshield wiper.

13. A control system for intermittently switching an electrical device between an energized condition in which the device is operative and an unenergized condition in which the device is not operative, said control system including in combination, an energizing circuit, a switching circuit including first transistor means and coupling said energizing circuit to the electrical device to energize the electrical device, said first transistor means having a conductive state for applying current to the electrical device to place the same in the energized condition and a non-conductive state in which the electrical device is in the unenergized condition, an oscillator circuit including second transistor means and coupled to said switching circuit, said oscillator circuit being constructed to generate bursts of electrical energy at spaced intervals for establishing said first transistor means in said conductive state during said bursts of energy, and a resistance-capacitance network included in said oscillator circuit for controlling the repetition rate of said bursts of energy.

References Cited by the Examiner
UNITED STATES PATENTS

| | | | |
|---|---|---|---|
| 2,782,356 | 2/1957 | Manheimer | 318—346 X |
| 2,945,997 | 7/1960 | Kennedy | 318—341 |

ORIS L. RADER, *Primary Examiner.*

J. C. BERENZWEIG, *Assistant Examiner.*